United States Patent [19]

Clay et al.

[11] 4,036,701

[45] July 19, 1977

[54] STEAM DISTILLATION APPARATUS CONVERTIBLE TO TWO SEPARATE MODES OF OPERATION

[76] Inventors: Byron Jan Clay, 103 Kathy Drive, Brownsburg, Ind. 46112; Michael Lhotellier Wall, 1721 Shawnee Road, Indianapolis, Ind. 46260; James Robert Cunningham, 117 E. South St., Lebanon, Ind. 46052

[21] Appl. No.: 684,904

[22] Filed: May 10, 1976

Related U.S. Application Data

[63] Continuation of Ser. No. 543,673, Jan. 24, 1975, abandoned.

[51] Int. Cl.$^2$ .......................... B01D 3/02; B01J 1/00
[52] U.S. Cl. .................................. 202/204; 203/95; 203/DIG. 2; 202/168; 252/360
[58] Field of Search ............. 202/204, 168, 169, 170, 202/197, 202; 203/95, 96, 97, DIG. 2; 23/267 MS; 252/360

[56] References Cited

U.S. PATENT DOCUMENTS 3,334,025  8/1967  Reid .................... 203/DIG. 2
3,666,633  5/1972  Essex et al. ................ 203/95

Primary Examiner—Frank W. Lutter
Assistant Examiner—Frank Sever
Attorney, Agent, or Firm—Woodard, Weikart, Emhardt & Naughton

[57] ABSTRACT

Distillation apparatus for steam distilling of solvents is disclosed in combination with phase separation means which is readily adjustable to accommodate fluids which are either more dense or less dense than water. This is accomplished in the preferred embodiment by attaching a pipe to an appropriate opening in the phase separation means. This permits a readily changed operation from one solvent to another and permits standardization of manufacture to accommodate essentially all water immiscible solvents.

10 Claims, 4 Drawing Figures

STEAM DISTILLATION APPARATUS CONVERTIBLE TO TWO SEPARATE MODES OF OPERATION

This is a continuation of application Ser. No. 543,673, filed Jan. 24, 1975, now abandoned.

BACKGROUND OF THE INVENTION

1. Field of the Invention

This invention relates to steam distillation and apparatus associated therewith to rapidly separate water from the distilled solvent.

2. Description of the Prior Art

Steam distillation apparatus for recycling various solvents which are immiscible in water is well known. Devices for separating water from the distilled solvent are also well known. One such separation device is disclosed in U.S. Pat. No. 3,692,467 To Durr et al. While such devices perform admirably for the solvent for which they were designed, they are not appropriate for use with both solvents which are heavier than water and solvents which are lighter than water. Since the materials used in manufacturing such devices are high quality stainless steel, the cost of a separate water separator for a second type of solvent is quite high.

Typically in the prior art, different distillation units were designed and stocked to accommodate different solvents. This not only presented inventory problems, but also limited the versatility of the products sold to the customers.

SUMMARY OF THE INVENTION

This invention relates to distillation apparatus for purifying solvents which are immiscible in water, whether they are more dense or less dense than water. The precise definition of the invention is set forth in the claims and reference should be made thereto to learn of the scope intended. Generally, however, the invention can be said to relate to steam distillation apparatus which includes a phase separating device incorporating a coalescer and which has means for optionally connecting either desired one of two outlets to the bottom of the phase separating device thereby permitting the use of the device without substantial replumbing or modification with solvents which are more dense than water or with solvents which are less dense than water. The invention provides versatility and ease of operation of steam distillation apparatus without the need for substantial plumbing changes or additional equipment when change is made from distilling liquids which are more dense than water to distillation of liquids which are less dense than water or vice versa.

DESCRIPTION OF THE PREFERRED EMBODIMENT

Figure 1:
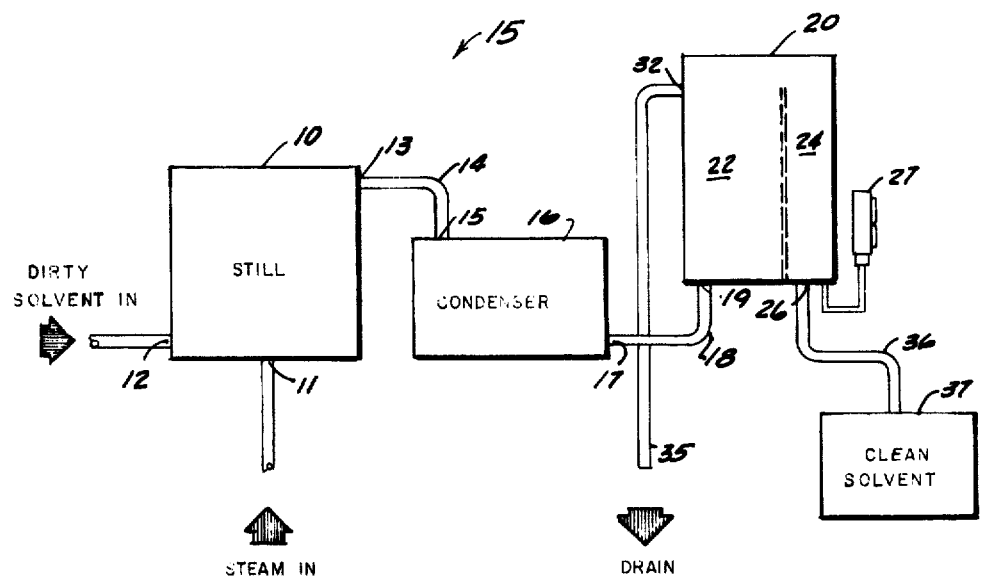
FIG. 1 is a diagram of a system which embodies the invention.

Referring to FIG. 1, there is illustrated diagrammatically a system which embodies the invention. A distillation portion 15 includes a vaporizer 10 and a condenser 16. The vaporizer 10 has a dirty solvent inlet 12, a steam inlet 11 and a vapor outlet 13. The vapor outlet 13 connects through a conduit 14 to an inlet 15 of condenser 16. Condenser 16 has an outlet 17 which connects through conduit 18 to inlet 19 of a tank 22 in phase separation means 20. Distillation portion 15 is of conventional design and produces distillation of the solvent by vigorous admixture of steam with the dirty solvent and condensation of the resulting vapors.

Figure 2:
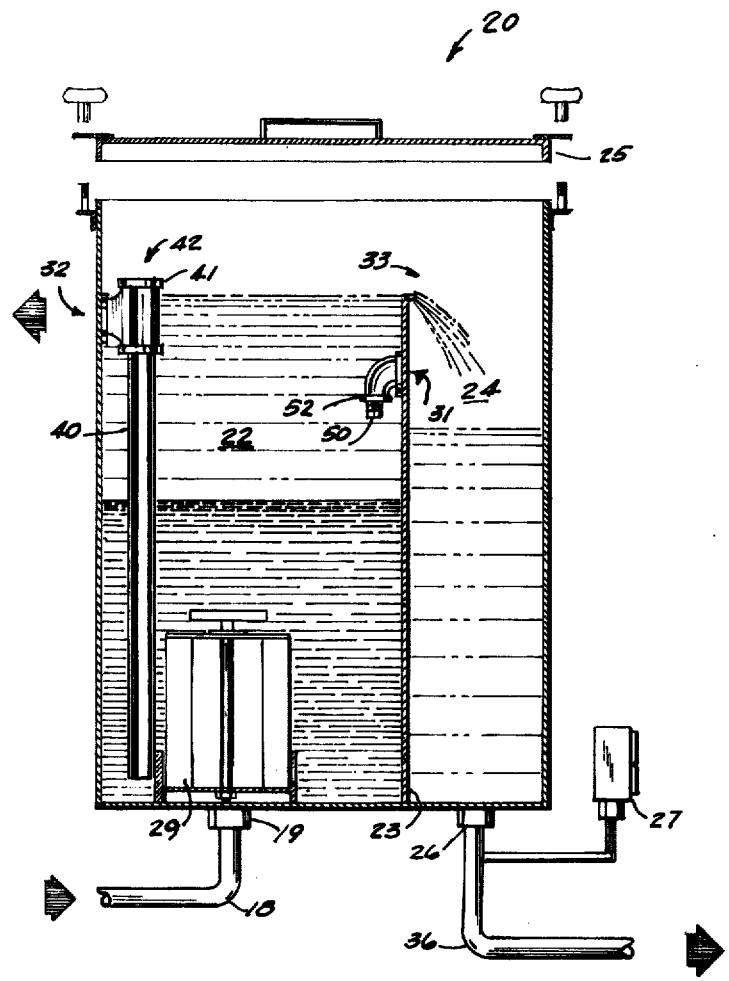
FIGS. 2 and 3 are drawings of a side view cross section of the phase separation means of the system shown in FIG. 1, FIG. 2 showing one mode of operation and FIG. 3 showing the other.
Figure 3:
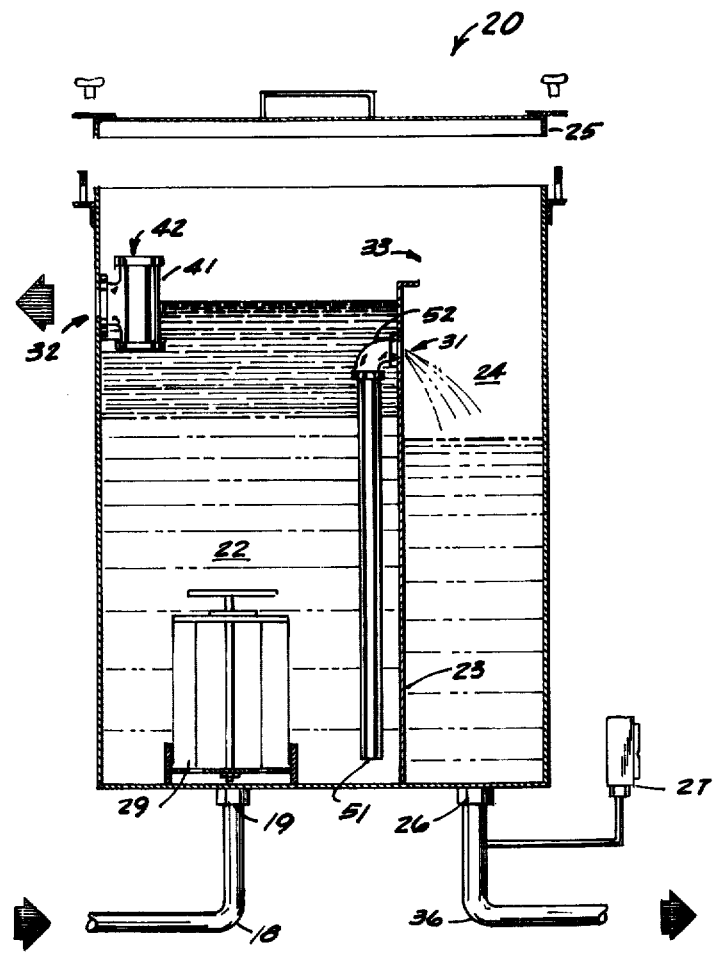
Figure 4:
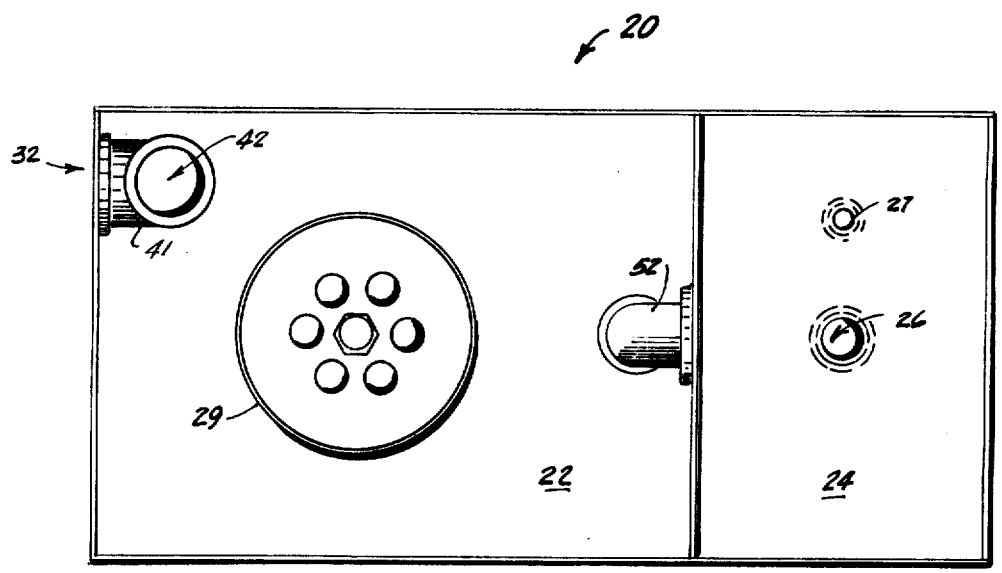
FIG. 4 is a top view of the phase separation means shown in FIGS. 2 and 3, with the lid removed.

The phase separation means 20 is illustrated in more detail in FIGS. 2 through 4. It includes tank 22 having an inlet 19, a first outlet opening 31, a second outlet opening 32 and a third outlet opening 33 over the top of wall 23 which separates tank 22 from chamber 24. A coalescer 29 is affixed to the base of tank 22 and connected to inlet 19 so that all of the liquids flowing into tank 22 are forced to pass through the coalescer 29. The coalescer 29 is of a type disclosed in U.S. Pat. No. 3,692,467 and that patent is hereby incorporated by reference into this application.

The phase separation means 20 incorporates a first means (elbow connector 52) for permitting the first outlet opening 31 to readily be either connected to a plug and thereby be closed or connected to tube 51 extending to a point near the bottom of the tank. It also incorporates a second means (tee connector 41) for permitting said second outlet opening 32 to readily be either open to a point near the upper portion of tank 22 or connected to tube 40 extending to a point near the bottom of the tank 22. Tube 40 is a stainless steel pipe 40 which is removably threaded into an internally threaded tee connector 41 attached to the second outlet opening 32. Optionally, either a plug 50 or a stainless steel tube 51 may be threadedly engaged into an internally threaded elbow connector 52 which attaches to the first outlet opening 31 of the tank.

The phase separation means 20 also includes vent means preventing siphon action at any of the outlet openings. This includes an opening 42 at the upper portion of tee connector 41 and an opening at the top of chamber 24 into which the first outlet opening 31 and the third outlet opening 33 enter. The top of the phase separation means includes a lid 25 which may be readily removed for access to the inside portions of the phase separation means 20.

It can be noted that the first outlet opening 31 and the third outlet opening 33 both connect to chamber 24. Chamber 24 has an outlet 26 at the bottom portion thereof which connects through conduit 36 to a clean solvent tank 37. Additionally, an adjustable pressure sensitive switch 27 is connected near the bottom of the chamber to operate in response to the liquid pressure near the bottom of the chamber 24. The switch 27 operates to control the level of solvent in chamber 24 by operating a drain pump (not shown). The level at which the switch operates can be adjusted according to whether the first outlet opening is plugged as is shown in FIG. 2 or open as is shown in FIG. 3. Essentially all parts of the distillation apparatus disclosed which contact distilled solvent, except the coalescer 29, are made of stainless steel.

In operation, for a liquid less dense than water, the configuration shown in FIG. 2 is achieved by threading tube 40 into tee 41 and plug 50 into elbow 52. The pressure sensitive switch has been adjusted to drain chamber 24 when the solvent in chamber 24 approaches the top of wall 23. To change to distillation of solvents which are heavier than water, pipe 51 is inserted in place of plug 50 in elbow 52 and pipe 40 is removed from tee 41. The pressure sensitive switch 27 is then adjusted to cause emptying of chamber 24 when the level of solvent therein approaches outlet 31. As can be seen, the change can be made very rapidly and the water outlet connections of the entire apparatus remain constant except for the insertion of tube 40. Similarly, the solvent connections to the apparatus need not be changed and the pressure sensitive switch is always associated with the solvent phase. It can be seen that the change of the apparatus from operation with fluids more dense than water to fluids less dense than water and vice versa can be accomplished very readily and that only one device will suffice for essentially all types of steam distillation of fluids which are immiscible with water.

As an alternative but less preferred embodiment of the invention, valves could be used to eliminate the need to physically insert pipes and plugs to change the mode of operation. As another alternative, the vaporizer portion of the invention could be made to incorporate aspects of the disclosure of U.S. Pat. No. 3,853,513 if desired. Also, a water screen such as is shown in U.S. Pat. No. 3,692,467 may be used.

Since many embodiments might be made of the present invention and since many changes might be made in the embodiment disclosed herein, it is to be understood that the foregoing description and example are to be interpreted as illustrative only and that the invention is to be defined by the claims.

What is claimed is:

1. Distillation apparatus for purifying solvents which are immiscible with water comprising:
   a. distillation apparatus for steam distilling solvents including:
      1. a vaporizer having a steam inlet, a dirty solvent inlet and a vapor outlet, and
      2. a condenser having an inlet connected to said vapor outlet, and having a liquid outlet for condensed liquids;
   b. phase separation means connected to said liquid outlet, said phase separation means including:
      1. a tank which has an inlet, a first outlet opening in the upper portion of said tank, a second outlet opening higher than said first outlet opening, and a third outlet opening higher than said second outlet opening, and
      2. a coalescer within said tank and connected to said inlet whereby all of the liquids flowing into said tank are forced to pass through said coalescer.
   c. first means for alternately permitting said first outlet opening to be connected to a plug means or for permitting said fist outlet opening to be connected to a tube extending to a point near the bottom of said tank; and
   d. second means for alternately permitting said second outlet opening to be opened to a point near the upper portion of said tank or for permitting said second outlet opening to be connected to a tube extending within said tank to a point near the bottom of said tank, while said second means is open to a point near the upper portion of said tank.

2. The distillation apparatus of claim 1 which additionally includes vent means to prevent siphon action at any of said outlet openings.

3. The distillation apparatus of claim 2 which additionally includes a chamber to which said first outlet opening and said third outlet opening both connect.

4. The distillation apparatus of claim 3 in which said chamber has a chamber outlet at the bottom portion thereof.

5. The distillation apparatus of claim 4 which additionally includes an adjustable pressure sensitive switch connected near the bottom of said chamber to operate in response to the liquid pressure near the bottom of said chamber.

6. The distillation apparatus of claim 1 in which said second means for permitting is a tee connector which attaches within said tank at said second opening and said first means for permitting is an elbow connector which attaches within said tank at said first opening.

7. The distillation apparatus of claim 6 which additionally includes a pipe threadably attached to said tee connector and a plug threadedly attached to said elbow.

8. The distillation apparatus of claim 6 which additionally includes a chamber to which said first outlet opening and said third outlet opening both connect and in which said chamber has a chamber outlet at the bottom portion thereof.

9. The distillation apparatus of claim 8 in which essentially all parts of said distillation apparatus which contact distilled solvent, except said coalescer, are made of stainless steel.

10. The distillation apparatus of claim 6 in which one opening of said tee connector and one opening of said elbow connector are internally threaded.

* * * * *